United States Patent
Liu et al.

(10) Patent No.: US 9,615,287 B2
(45) Date of Patent: Apr. 4, 2017

(54) DYNAMIC BANDWIDTH SCHEDULING WITH TRANSPORT NETWORK

(71) Applicant: T-Mobile USA, Inc., Bellevue, WA (US)

(72) Inventors: Chunming Liu, Bellevue, WA (US); Bryan Fleming, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 113 days.

(21) Appl. No.: 14/575,451

(22) Filed: Dec. 18, 2014

(65) Prior Publication Data

US 2016/0183118 A1 Jun. 23, 2016

(51) Int. Cl.
H04W 28/02 (2009.01)
H04L 12/851 (2013.01)
H04L 12/927 (2013.01)
H04W 72/12 (2009.01)
H04L 12/911 (2013.01)
H04L 12/801 (2013.01)

(52) U.S. Cl.
CPC ..... *H04W 28/0236* (2013.01); *H04L 47/2408* (2013.01); *H04L 47/29* (2013.01); *H04L 47/805* (2013.01); *H04L 47/823* (2013.01); *H04W 72/1231* (2013.01)

(58) Field of Classification Search
CPC .......... H04W 28/0236; H04W 72/1231; H04L 47/2408; H04L 47/805
USPC .... 370/229, 230, 230.1, 231, 232, 235, 241, 370/252, 351, 389, 395.1, 395.2, 395.21, 370/395.4
See application file for complete search history.

(56) References Cited

U.S. PATENT DOCUMENTS

| | | | |
|---|---|---|---|
| 5,132,961 A | 7/1992 | Thiebaut et al. | |
| 6,912,575 B1 | 6/2005 | Swift et al. | |
| 8,542,586 B2 | 9/2013 | Chen et al. | |
| 2004/0184477 A1* | 9/2004 | Tavli ............... | H04W 28/26 370/461 |

(Continued)

FOREIGN PATENT DOCUMENTS

| | | |
|---|---|---|
| WO | WO2008022459 A1 | 2/2008 |
| WO | WO2010051242 A1 | 5/2010 |
| WO | WO2014089770 A1 | 6/2014 |

OTHER PUBLICATIONS

PCT Search Report and Written Opinion mailed Mar. 25, 2016 for PCT Application No. PCT/US15/65030, 9 pages.

(Continued)

*Primary Examiner* — Obaidul Huq
(74) *Attorney, Agent, or Firm* — Lee & Hayes, PLLC (57) ABSTRACT

Methods and computing systems for allocating an information rate to a particular traffic type of a plurality of traffic types of egress traffic is described. A state of the particular traffic type for a particular time slot of a current time period is determined. This includes determining the information rate such that a loss probability threshold is not exceeded, based on historical data of the particular traffic type. The historical data includes a plurality of observed throughput rates of the particular traffic type during a plurality of previous time periods at which the particular traffic type experienced the state of the particular traffic type. The information rate (e.g., a committed information rate) is allocated to the particular traffic type for the particular time slot.

19 Claims, 6 Drawing Sheets

(56) References Cited

U.S. PATENT DOCUMENTS

| | | |
|---|---|---|
| 2008/0002720 A1 | 1/2008 | Chao et al. |
| 2010/0208588 A1 | 8/2010 | Vinokour et al. |
| 2010/0220724 A1 | 9/2010 | Rabie et al. |
| 2010/0220731 A1 | 9/2010 | Diab et al. |
| 2011/0058656 A1 | 3/2011 | Hartwich et al. |
| 2011/0200017 A1 | 8/2011 | Amalfitano |
| 2012/0013748 A1 | 1/2012 | Stanwood et al. |
| 2012/0027014 A1 | 2/2012 | Mack-Crane et al. |
| 2013/0121261 A1 | 5/2013 | Yao et al. |
| 2013/0142055 A1* | 6/2013 | Bao .................. H04W 36/0011 370/252 |
| 2013/0223287 A1 | 8/2013 | Ahmad |
| 2013/0275597 A1 | 10/2013 | Feng et al. |
| 2014/0082193 A1 | 3/2014 | Bugenhagen |
| 2014/0177840 A1 | 6/2014 | Liu |
| 2014/0233423 A1 | 8/2014 | Jha et al. |
| 2015/0188773 A1 | 7/2015 | DeCusatis et al. |
| 2016/0014634 A1 | 1/2016 | Liu et al. |
| 2016/0182255 A1 | 6/2016 | Liu et al. |

OTHER PUBLICATIONS

PCT Search Report and Written Opinion mailed Apr. 18, 2016 for PCT Application No. PCT/US15/64490, 12 pages.

Office action for U.S. Appl. No. 14/327,086, mailed on Feb. 12, 2016, Liu et al., "Cellular Network Backhaul Oversubscription", 6 pages.

PCT Search Report and Written Opinion mailed Oct. 14, 2015 for PCT Application No. PCT/US15/39324, 10 pages.

Office action for U.S. Appl. No. 14/575,338, mailed on Jun. 16, 2016, Liu et al., "Tunneling with Routing for Transport Network", 17 pages.

Office action for U.S. Appl. No. 14/575,338, mailed on Dec. 1, 2016, Liu et al., "Tunneling with Routing for Transport Network", 19 pages.

\* cited by examiner

DYNAMIC BANDWIDTH SCHEDULING WITH TRANSPORT NETWORK

RELATED APPLICATIONS

This application is related to U.S. application Ser. No. 14/327,086, filed on Jul. 9, 2014, and entitled "Cellular Network Backhaul Oversubscription," the entirety of which is incorporated herein by reference. This application is also related to U.S. application Ser. No. 14/575,338, filed Dec. 18, 2014, and entitled "Tunneling with Routing for Transport Network," the entirety of which is incorporated herein by reference.

BACKGROUND

Mobile network operators utilize Alternative Access Vendors (AAVs) to extend their network to areas that the operators' networks do not cover. An AAV provides a wide area networking network interface (e.g., a user network interface, or "UNI") and provides a virtual circuit between the mobile cellular location and the carrier's core network. The networking interface may be Carrier Ethernet, Multi-protocol Label Switching (MPLS), Frame Relay, Asynchronous Transfer Mode (ATM), or other interface type that supports virtual circuits or virtual channels (VC).

A VC is provisioned with a committed data rate (CDR), also called a committed information rate (CIR), which is specified in a service level agreement (SLA). A peak information rate (PIR) is the maximum burst speed allowed on the VC, with packets that exceed the CIR up to the PIR being "best effort" and therefore non-guaranteed. The carrier and the AAV typically employ policers at the UNI handoff to monitor and shape throughput to conform to the CIR and/or PIR.

The Mobile Ethernet Forum (MEF) has defined a two-rate, three-color marker (trTCM) algorithm for Customer Edge (CE) Virtual Local Area Network (VLAN) Class of Service (CoS). This algorithm can be implemented via two token buckets. One bucket is used to determine an in-profile service frame rate per the CoS, following the CIR value, while the other bucket is used to determine an excess service frame rate per CoS, following the PIR value.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In the MEF trTCM scheme discussed above, each bucket size has a fixed value and the MEF trTCM does not differentiate between service priorities for multimedia traffic. Embodiments of the present disclosure utilize real-time recalculation of bandwidth scheduling and rate enforcement to provide consistently high-quality service in an environment with cell cluster traffic aggregation and UNI bandwidth (e.g., CIR) overbooking A transport network provides, in some embodiments, a single virtual circuit (VC) to carry the aggregated traffic from the cellular cluster to a core network. A CIR for the VC is, in some embodiments, an oversubscribed CIR such as is described in U.S. application Ser. No. 14/327,086, filed on Jul. 9, 2014, and entitled "Cellular Network Backhaul Oversubscription."

The aggregated traffic includes different traffic types having different egress priorities. For example, voice traffic may have a highest priority, while data traffic, video traffic, management traffic, and so forth may each have different levels of priority. A traffic scheduler divides the different traffic types into queues. The traffic scheduler prioritizes assigning a portion of the total CIR available on the VC to high priority voice traffic based on the number of voice connections. Other, lower-priority traffic queues are assigned CIR based on historical data such that a loss probability threshold is not exceeded. A different loss probability threshold may be set for different traffic types.

To assign CIR to a traffic type such that a loss probability threshold is not exceeded, the scheduler determines a state of the traffic type. A state of the traffic type may be a number of extant connections, a number of connected end-points, or other similar measure or combination of measures of traffic state. The historical data used to determine a CIR for the traffic type includes a plurality of observed throughput rates of the particular traffic type during a plurality of previous time slots at which the particular traffic type experienced the same state of the particular traffic type.

If a sufficient number of prior time slots having the same state are observed for a particular traffic type, then a traffic envelope can be identified. The traffic envelope provides an upper bound on the observed throughput rates of the particular traffic type. The observed throughput rates observed during previous time periods for that state, as well as the observed probabilities of each of those previous throughput rates occurring during those time periods, provides sufficient statistical information to identify an assigned information rate (e.g., a CIR) that is assigned to the traffic type to meet a loss probability threshold. For example, a loss probability threshold may be 1%, 0.1%, or other probability. A traffic scheduler or network management device determines the minimum assigned information rate to meet the loss probability threshold, based on a statistical technique, such as a Chernoff bound approximation, or other approximation method. The traffic scheduler or network management device refers to a policy table that identifies a loss probability threshold for the various traffic types. The loss probability thresholds for different traffic types may be the same as each other or different from one another.

Also described herein is a variable CIR scheme. At different times, such as night and day, day-of-the-week, day-of-the-month, holidays, weekends, and so forth, historically observed throughputs are likely to differ. More people will use a mobile service during the day, for example, than at night. Therefore, the transport carrier may dynamically allocate CIR on the VC based on time-of-day or other criteria. The traffic scheduler assigns CIR to the different traffic types based on the CIR available at any given time.

As used herein an "extant" connection is a connection that has been established between two end-points, and over which traffic may flow at some point, though not necessarily at any particular time due to the bursty nature of some traffic. At some point a connection may be considered to be de-established either by affirmative action on the part of the end-points to tear down the connection, or based on a time-out period, during which no traffic flows over the connection. As used herein, a connection (voice, data, video, or other) is "active" when it is currently transmitting information. A connection may be extant even if it is not currently active.

Example Transport Environment

Figure 1:
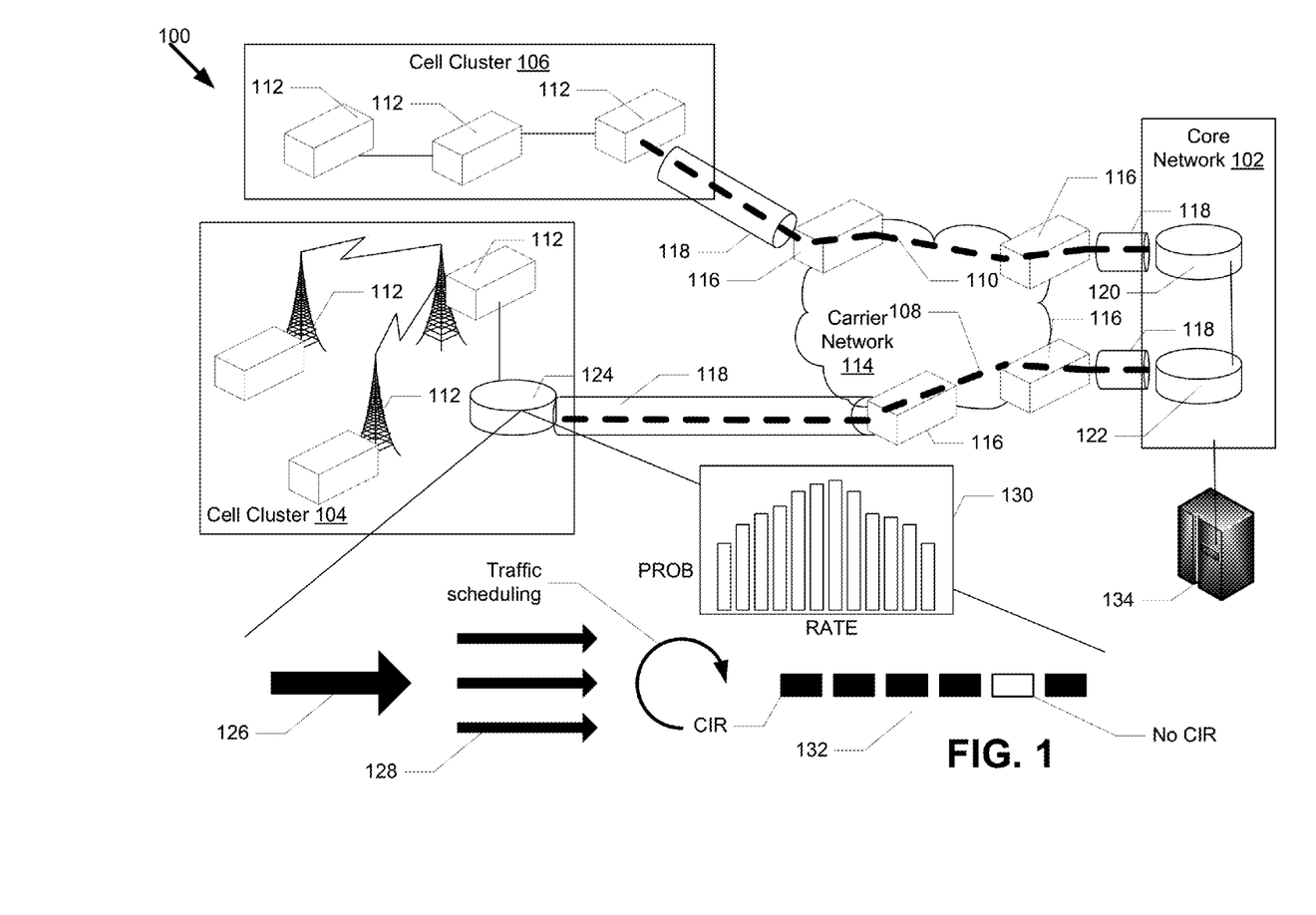
FIG. 1 illustrates an environment for dynamic cellular backhaul scheduling with carrier network.

FIG. 1 illustrates an environment 100 for dynamic network scheduling with carrier transport. A core network 102 is coupled to both a cell cluster 104 and a cell cluster 106 via virtual channels (VC) 108 and 110, respectively. The cell cluster 104 includes multiple microwave-connected cell sites 112. The cell cluster 106 includes multiple cell sites 112 that are coupled via wired connections, such as in a campus environment. Embodiments are not limited by cell clusters of any type or types, and the two different types of cellular clusters are included in FIG. 1 for the sake of illustration only. Cell clusters may have both wired and wireless connections between cell sites 112; the cell clusters may all be wired, or they may all be wireless.

The cell sites 112 may support one or more of Global System for Mobile Communications (GSM), Code Division Multiple Access (CDMA), IEEE 802.11 (Wi-Fi), Worldwide Interoperability for Microwave Access (WiMax), Long-term Evolution (LTE), or other wireless transceiver station types configured to communicate with wireless end-user devices, such as mobile telephone handsets, tablet computers, wireless modems, personal computers, laptops, and so forth. The core network 102 may provide to the wireless end-user devices one or more of voice service, video service, data service, messaging service (e.g., short messaging service (SMS), multimedia messaging service (MMS)), or other wireless services. The cell sites 112 include in various embodiments, a Universal Mobile Telecommunications System Third Generation (UMTS 3G) base station (e.g., a NodeB), a fourth generation (4G), Evolved Node B (e.g., an eNodeB), or other device. Each cell site 112 may support more than one type of voice and/or data connections for wireless end-user devices.

Environment 100 includes a carrier network 114. In some embodiments, the connection between the core network 102 and the cell cluster 104 or 106 may be over two or more carrier networks, with a handoff between the two or more carrier networks occurring at a network-to-network interface (NNI).

Provider Edge (PE) equipment 116 terminates user-to-network interfaces (UNIs) 118 with the core network 102, via core network devices 120 and 122, as well as with the cell cluster 104 and the cell cluster 106, via cell cluster devices, such as the customer edge (CE) device 124 of the cell cluster 104. The following description of network egress scheduling is described from the perspective of the CE device 124, but the same or similar process may occur on any of a cell site 112 device of the cell cluster 106, the core network device 120, or the core network device 122.

The CE device 124 directs aggregated egress traffic (represented by an arrow 126 in FIG. 1) from all cell sites 112 in the cell cluster 104 to the core network 102 via the VC 108. At any given time slot, there is a fixed amount of CIR provisioned on the VC 108, to be shared by all traffic types. The CIR is, in some embodiments, an oversubscribed CIR such as is described in U.S. application Ser. No. 14/327,086, filed on Jul. 9, 2014, and entitled "Cellular Network Backhaul Oversubscription."

The aggregated traffic 126 includes different traffic types, such as a voice traffic type, a data traffic type, a management traffic type, a video traffic type, and so forth. The CE device 124 is configured to provide different egress priorities to these different traffic types. In one example, voice traffic may be given a highest priority, with management traffic having a second priority, video traffic having a third priority, and data traffic having a fourth (and lowest) priority. Embodiments are not limited to any particular traffic type or types; and embodiments are not limited to any particular prioritizations of traffic types. For example, additional traffic types may include SMS traffic. An example prioritization scheme may include prioritizing video traffic over voice traffic. Also, other definitions of traffic type may be used, such as class of service (COS) types. There may be a Real-time COS traffic type, near-real time COS traffic type, non-real time COS traffic type, and so forth. In some embodiments, voice, video, data, management, and other traffic types may or may not be segregated from one another. For example, voice and video traffic may both be treated together as real-time COS traffic. In other example, some data traffic, such as email, may be treated as non-real time COS traffic, but other data traffic, such as video game traffic, may be treated as near-real time COS traffic. Other examples are possible without departing from the scope of embodiments.

In some embodiments, the CE device 124 divides the aggregated traffic 126 into a plurality of traffic queues 128, based on traffic type. The CE 124 places the packets or frames associated with a particular traffic type into a particular one of the traffic queues 128. For example, all voice packets go into a voice traffic queue, and so on.

In some embodiments, such as where one of the traffic queues 128 is a voice traffic queue, or a real-time traffic queue, the CE device 124 assigns a portion of the total available CIR to the voice traffic queue for a particular time slot, time slot i, such that:

$$CIR_v(i) = N_v(i) \times p_v \times R_v \quad \text{Equation 1}$$

where $N_v(i)$ is the number of voice connection at time slot i, $p_v$ is the probability of a voice connection being in an active state, and $R_v$ is the packet rate of a voice connection in the active state. Voice packets in the voice queue are assigned CIR and output on the VC 108 via the UNI 118 in packets or frames 132.

For other traffic types, as well as for voice traffic in some embodiments, the CE device 124 utilizes historical data to allocate CIR to the traffic types such that a loss probability threshold (s) is not exceeded. All extant data connections in a cell cluster, such as the cell cluster 104, are treated as being independent of one another. The loss probability threshold ($\epsilon$) for a particular traffic type is therefore estimable by a Chernoff bound approximation, such as:

$$P\{\rho_{data} \leq CIR_{data}\} \approx e^{-A^*(CIR_{data})} < \epsilon \quad \text{Equation 2}$$

Where $A^*(x) = \sup\{\theta x - A(\theta)\}$, $A(x) = \sum_{i=1}^{Q} J_i \cdot \log M_i(\theta)$ and $M_i(\theta) = \sum_{k=1}^{K_i} p_k \cdot e^{\theta r_k}$. Q indicates a number of traffic types, with each type having a state of $J_i$ extant connections. $p_k$ is the probability that a data rate $r_k$ of data traffic type i is observed. $r_k$ is the throughput rate of a traffic type i; there are $K_i$ states of its data rate, and $p_k$ is the probability that a traffic type is observed to have a throughput $r_k$.

The solution for equation 2 is given as follows:

$$CIR_{data} = \Sigma_i J_i \frac{M'_i(\theta)}{M_i(\theta)} \quad \text{Equation 3}$$

where θ is the solution to the following equation:

$$\log \epsilon = A(\theta) - \theta A'(\theta) - \log \theta - \tfrac{1}{2} \log A''(\theta) - \log(2\pi) \quad \text{Equation 4}$$

The above solution may be simplified by observing peak throughputs for the different traffic types, at different states at the CE device 124 over a plurality of previous time periods. Sampling on the peak throughput envelop of data traffic is performed, and a marginal distribution is determined using a histogram 130 of data throughput rates and probabilities, as illustrated in FIG. 1 and Table 1.

TABLE 1

Histogram of peak throughput distribution at a particular state (e.g., number of connections)

| Rate range | R ≤ R1 | R1 ≤ R < R2 | R2 ≤ R < R3 | R3 ≤ R < R4 | R4 ≤ R < R5 | R5 ≤ R < R6 |
|---|---|---|---|---|---|---|
| Distribution probability | 10% | 15% | 30% | 25% | 10% | 10% |

From the observed throughput rates R (e.g., ranges of throughput rates) and probabilities of each of the throughput rates, the CE device 124 determines an allocation of CIR for the traffic type based on equations 3 and 4 above.

The CE device 124, or another device such as a network management device 134, determines tables of CIR to be assigned for a particular traffic type at a particular time slot based on the state of the particular traffic type and the particular time slot. The CE device 124 or the network management device 134 determines the tables based on the historical data as described above, including the observed throughput rates of the traffic types and the observed probabilities of the throughput rates. Information (e.g., CIRs) for each combination of possible time slots and each possible traffic states are determined for each traffic type and tabulated for look-up. This way, the scheduler in the CE device 124 does not have to recalculate the CIR from the historical data as described above for each time slot.

The historical data may be observed during previous time periods, such as for example during previous hours, days, weeks, months, etc. The CIR determined for a particular traffic type at a particular state at a particular time slot, may be determined based on time slots in the previous time periods that are the same as similar to the current time slot. A time slot may be a one second time slot, a one minute time slot, and 10 millisecond time slot, or other duration. In some embodiments, only historical data from the same time slots in previous time periods having the same state (e.g., the same number of extant connections) are used to determine CIR for the traffic type.

In some embodiments, historical data from time slots at similar times, such as within a minute, an hour, or during the day, or during the night, or other similar times, having the same state (e.g., the same number of extant connections) are used to determine CIR for the traffic type. In some embodiments, all previous time slots having the same state (e.g., the same number of extant connections) may be used to determine the CIR, regardless of the times that those states were observed. In one example, CIR for a particular traffic type at a current time slot occurring from 14:00:00 to 14:00:01 may be determined from previous time slots having the same state (e.g., the same number of extant connections) occurring from 14:00:00 to 14:00:01 on previous days. In another example CIR for a particular current time slot occurring from 14:00:00 to 14:00:01 may be determined from previous time slots having the same state (e.g., the same number of extant connections) occurring from 13:00:00 to 15:00:00 on previous days. These are just examples, and embodiments are not limited to these examples. For example, historical data from weekdays may be used to determine CIR for current weekday time slots, while historical data from weekend days may be used to determine CIR for current weekend day time slots.

The CE device 124 allocates portions of the total CIR to the different traffic types in the traffic queues 128 based on the state (e.g., number of extant connections) of the traffic types. The data packets or frames 132 belonging to a particular traffic type are output by the CE device 124 marked with a flag or other indicator to identify the packets as having been allocated CIR. When and if the CIR allotted to a particular traffic type is used up during the time slot, and additional data packets or frames 132 for the particular traffic type remain to be output during the particular time slot, the remaining data packets are output as "best effort" (e.g., not marked as having CIR), up to a Peak Information Rate (PIR) of the UNI 118. A lowest priority traffic type may be given a remainder of the available CIR, with the rest of its traffic treated as best effort, up to the PIR. The carrier network 114 may be configured to treat packets or frames marked with CIR from the CE device 124 as having a higher priority than packets not marked with CIR.

Figure 2:
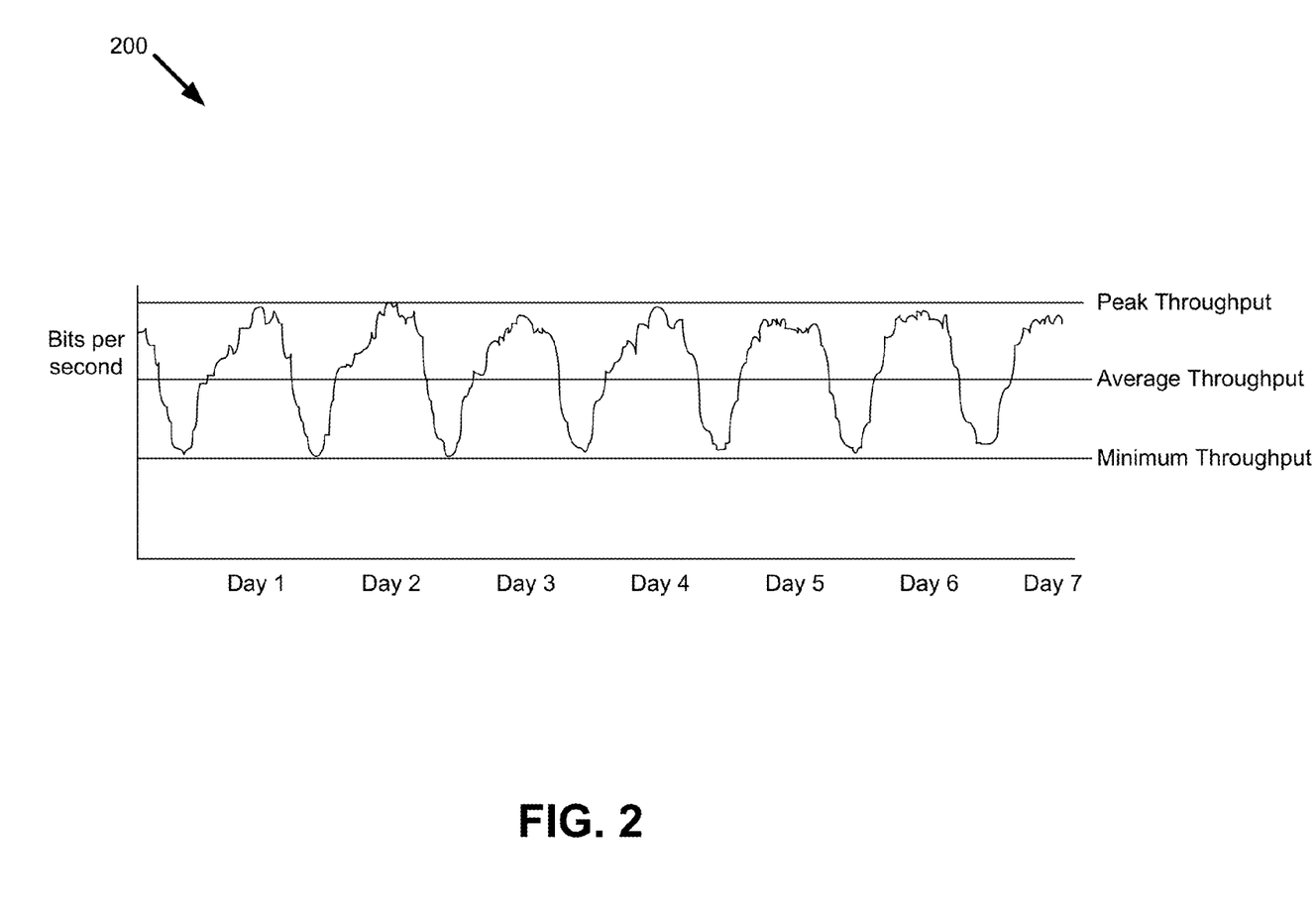
FIG. 2 illustrates a graph of observed throughput rates for a traffic type, from which a histogram of data rates and probabilities is determined.

FIG. 2 illustrates a graph 200 of observed throughput rates for a traffic type, from which a histogram of data rates and probabilities is determined. The graph 200 illustrates traffic of a particular traffic type aggregated from a plurality of cell sites of a cell cluster, such as cell sites 112 of the cell cluster 104. As noted above, CIR is allocated to a particular type of traffic based on historical data for the traffic type, and based on a state of the traffic type, such as the number of extant connections for a time slot. Graph 200 illustrates observed data rates for egress traffic over the course of six and a half days. At each time slot, the throughput rate is sampled along with the state of the traffic type. Ranges of rates and probabilities for a particular state are tabulated, such as in table 1. Using such historical data, a CIR to meet a certain loss probability threshold (ε) is determined as described above.

Example Processes

Figure 3:
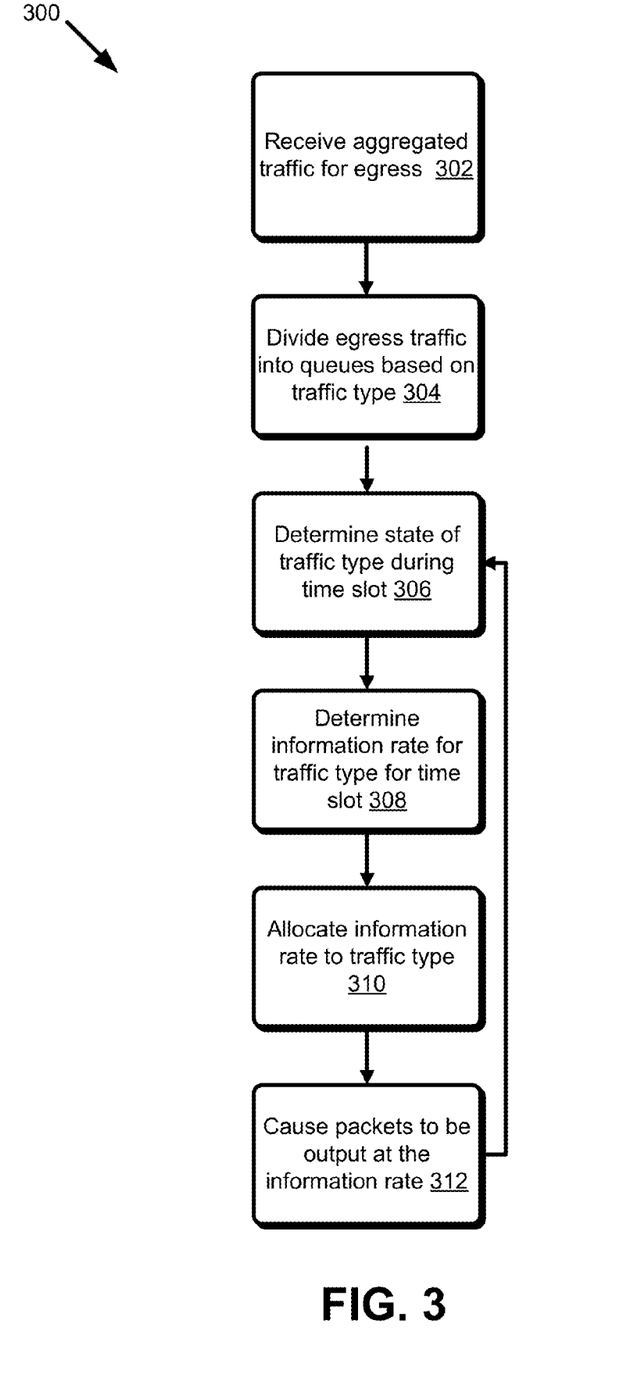
FIG. 3 illustrates a flow chart of an example process for dynamic cellular backhaul scheduling with carrier network.
Figure 4:
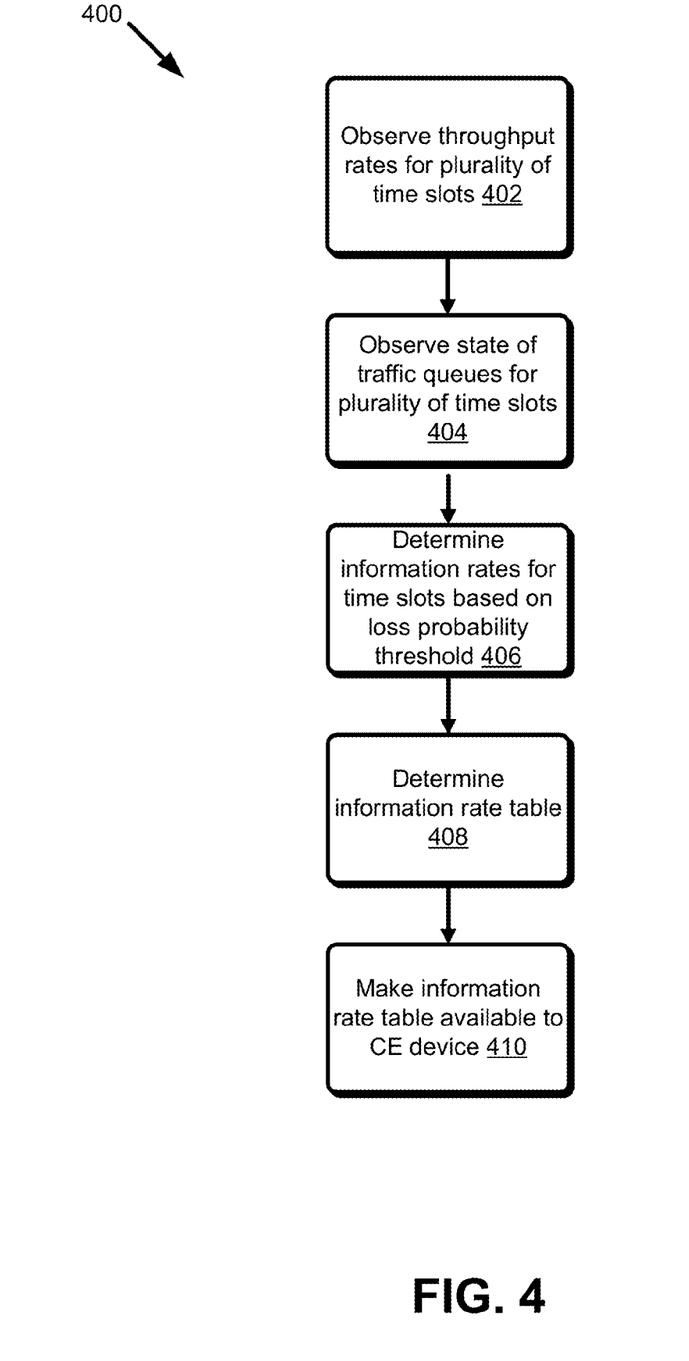
FIG. 4 illustrates a flow chart of an example process for determining an information rate for dynamic cellular backhaul scheduling with carrier network.

FIGS. 3 and 4 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates a flow chart of an example process 300 for dynamic network scheduling with carrier transport. At 302, a customer edge device, such as the customer edge device 124, receives aggregated traffic for egress to a VC provided by a transport network. The aggregated traffic is, in some embodiments, traffic aggregated from a plurality of cellular sites of a cellular cluster. The aggregated traffic includes a plurality of traffic types, such as one or more of a voice traffic type, a data traffic type, a video traffic type, a management traffic type, a real-time traffic type, a near-real time traffic type, a non-real time traffic type, and so forth.

At 304, the customer edge device divides the egress traffic into traffic queues based on the traffic type. In various examples, voice traffic is divided into a voice traffic queue, data traffic is divided into a data traffic queue, and so on. A scheduler of the customer edge device is configured to provide various levels of priority to the different traffic types and traffic queues.

At 306, the scheduler of the customer edge device determines a state of the particular traffic type for a particular time slot of a current time period. The state of the particular traffic type includes, in various embodiments, one or more of a number of extant connections for the particular traffic type, a number of endpoints that have extant connections of the traffic type, or other state information. The particular time slot may be a one minute time slot, a one second time slot, a 10 millisecond time slot, or be a time slot having some other duration. The current time period may be a month, day, week, hour, or other time period. The current time period is generally one for which observed throughputs vary in a pattern that is substantially repeated from one time period to another. In one example, traffic throughput varies throughout a day, with each day having similar throughput patterns. Thus, a day in this example may be used as the time period, with the day being divided into a plurality of time slots. By contrast, throughput rates from one time slot to another, being much shorter in duration, are less predictable, due to the bursty nature of some traffic types.

At 308, the scheduler of the customer edge device determines an information rate, such as committed information rate, for the particular traffic type such that a loss probability threshold for one or more traffic types is not exceeded. The scheduler of the customer edge device determines the information rate based on historical data of the particular traffic type, such as a plurality of observed throughput rates of the particular traffic type during a plurality of previous time periods at which the particular traffic type experienced the state of the particular traffic type. Thus, the information rate for the particular time slot is determined based on observed throughput rates, and observed probabilities for each of the observed throughput rates, from prior time slots in previous time periods during which the same state (e.g., the same number of extant connections or the same number of endpoints) was observed.

Determining the information rate based on the historical data includes, in various embodiments, referencing one or more information rate tables that are determined based on the state of the traffic type and the time slot. The traffic type and time slot are thus utilized to perform a look-up to the tables, which returns the information rate to ensure that the loss probability threshold for the traffic type is not exceeded. The table may be predetermined based on the historical data such that the customer edge device 124 performs a look up to the table to determine the information rate for the time slot rather than having to do the more computationally intensive task of calculating the information rate from the historical data. The scheduler may determine the information rate, or the information rate tables, by employing a Chernoff bound approximation as discussed elsewhere within this Detailed Description.

In some embodiments, the observed throughput rates from which the information rate is determined includes only throughput rates of the particular traffic type during a plurality of previous time slots that occurred at the same or similar times during previous time periods as the current time slot, and for which the state of the traffic type is the same. In other embodiments, all or some previous time slots at different times during the previous periods are utilized, as long as the previous time slots had the same state as the current time slot.

At 310, the scheduler of the customer edge device allocates the information rate to the particular traffic type for the particular time period. The allocated information rate is, in some embodiments, a CIR. The CIR is, in some embodiments, a portion of a total CIR that is available to the egress traffic during at least the time slot. In some embodiments, the total CIR is an oversubscribed CIR for a single virtual circuit provided by a transport carrier, such as is described in U.S. application Ser. No. 14/327,086, filed on Jul. 9, 2014, and entitled "Cellular Network Backhaul Oversubscription."

At 312, the customer edge device causes a plurality of packets or frames of the particular traffic type to be output via a physical interface to a carrier network according to at least the information rate. Outputting the packets or frames according to at least the information rate may include marking the packets or frames as having CIR. Additional packets or frames for the traffic type whose output over the time slot would cause the allocated CIR for the traffic type to be exceeded, may be output as having no CIR (and thus treated as "best effort"), output with CIR that was allocated to but not needed by other traffic types or traffic queues, dropped, delayed to be transmitted during another time slot, or treated in some other way. Once the time slot completes, a new state is determined for a new time slot at 306, and the process repeats.

FIG. 4 illustrates a flow chart of an example process 400 for determining an information rate for dynamic network scheduling with carrier transport. At 402, throughput rates for aggregated traffic are observed for a plurality of time slots, over a plurality of time periods for each of a plurality of traffic types. The time slots may be one minute time slots, one second time slots, 10 millisecond time slots, or have some other duration. The time periods may be a month, a day, a week, an hour, or other time period. The time periods are generally one for which observed throughputs vary in a pattern that is substantially repeated from one time period to another.

At 404, the states of the traffic types are observed for each of the time slots. The states of the traffic types may include one or more of the number of extant connections for a particular traffic type, a number of endpoints that have extant connections of a particular traffic type, or other state information.

At 406, a scheduler of a customer edge device, such as the customer edge device 124, or a network monitoring device, such as the network management device 134, determines information rates for a plurality of states of a traffic type such that a probability loss threshold for the traffic type is not exceeded. The scheduler of the customer edge device or the network management device determines the information rates based on the historical data of the particular traffic type, such as based on a plurality of observed throughput rates of the traffic types during a plurality of previous time periods. Thus, the information rates are determined based on observed throughput rates, and observed probabilities for each of the observed throughput rates, for time slots in observed time periods during which a particular state (e.g., a number of extant connections or a number of endpoints) was observed.

The scheduler or network management device may determine the information rates by employing a Chernoff bound approximation as discussed elsewhere within this Detailed Description. In some embodiments, the observed throughput rates from which the information rates for a traffic type are determined includes only throughput rates of the traffic type during a plurality of previous time slots that occurred at the same or similar times during previous time periods as the current time slot, and for which the state of the traffic type was the same. In other embodiments, all or some previous time slots at different times during the previous periods are utilized to determine the information rates for a traffic type, as long as the previous time slots had the same states.

At 408, the scheduler of the customer edge device or a network management device determines one or more information rate tables based on the information rates determined at 406. The information rate tables enable a scheduler of a customer edge device to perform a look-up based on a current time slot and a current state of a traffic type for the current time slot, and retrieve an information rate to allocate to the traffic type for the current time slot.

At 410, the scheduler or the network management device makes the information rate tables available to a scheduler. Making the information rate tables available may include uploading some or all of the information rate tables, or updates to the information rate tables, to one or more customer edge devices, or taking other action.

Example Computing System

Figure 5:
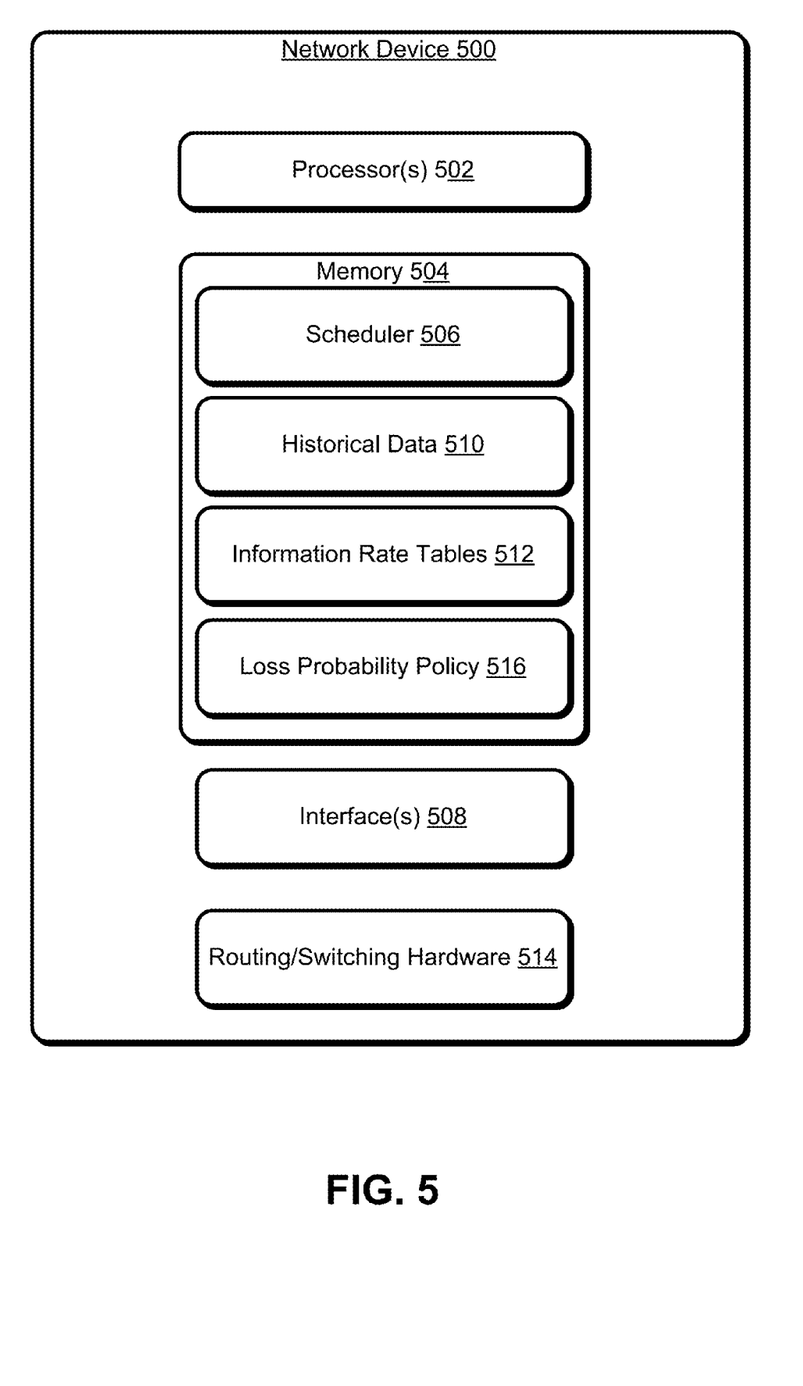
FIG. 5 illustrates an example network device configured to perform dynamic cellular backhaul scheduling with carrier network.

FIG. 5 illustrates an example network device 500 configured to perform dynamic network scheduling with carrier transport. As illustrated in FIG. 5, the network device 500 includes processor(s) 502 and memory 504. The network device 500 may be the same as or similar to the CE device 124, or other device such as the core network devices 120 and 122.

The memory 504 includes a scheduler 506 configured to determine a state of a particular traffic type for a particular time slot of a current time period, and to determine the information rate for the particular traffic type such that a loss probability thresholds for the various traffic types are not exceeded, as described elsewhere within this Detailed Description. The information rate is determined by the scheduler 506 based on historical data 510 of the particular traffic type. The historical data includes, in some embodiments, a plurality of observed throughput rates of the particular traffic type, and probabilities for each of the observed throughput rates, during a plurality of previous time periods at which the particular traffic type experienced the state of the particular traffic type.

The scheduler 506 allocates the determined information rate to the particular traffic type for the particular time period. The scheduler 506 causes a plurality of packets or frames of the particular traffic type to be output via a physical interface 508 to a carrier network at least at the information rate. Outputting the packets or frames according to the information rate includes, in some embodiments, allocating includes allocating a CIR to the particular traffic type from a portion of an oversubscribed CIR that is available to the egress traffic over a single virtual circuit provided by the carrier network during at least the time slot. The packets or frames may be marked as having CIR, as described elsewhere within this Detailed Description. The scheduler 506 may determine the information rate by referencing or performing a look-up to information rate tables 512. As described elsewhere within this Detailed Description, the information rate tables 512 enables the scheduler 506 to perform a look-up based on a current time slot and a current state of a traffic type for the current time slot, and retrieve an information rate to allocate to the traffic type for the current time slot.

In some embodiments, the scheduler 506 determines the information rate tables 512, and/or the information rates themselves, based on the historical data 510. In some embodiments, the information rate tables 512 are downloaded from another device, such as the network management device 134. The scheduler 506 is, in some embodiments, configured to upload the historical data 510 to the network management device 134 so that the information rate tables 512 may be determined.

Although the network device 500 is illustrated in FIG. 5 as having software components stored in memory 504, some or all functions of the software components may be performed within hardware, such as within the routing/switching hardware 514. The memory 504 may include one or more configuration files that configure the routing/switching hardware 514 of the network device 500 to perform one or more functions of the scheduler 506 that are described above. In one example, a software component of the scheduler 506 may collect the historical data 510, determine or download the information rate tables 512, and make the information rate tables 512 available to a hardware component of the scheduler 506 that is implemented within the routing/switching hardware 514. The routing/switching hardware 514 may one or more of divide the aggregated egress traffic into traffic queues, perform a look-up to the information rate tables 512, assign information rates to the traffic types/traffic queues based on the information rate tables 512, and output frames or packets via the interface 508 according to the determined information rate.

The scheduler 506 may be configured to determine The probability loss thresholds for each traffic type by referring to a loss probability policy 516. The Loss probability policy 516 includes data indicating probability loss thresholds for one or more traffic types. The probability loss thresholds indicated in the loss probability policy 516 may be the same as each other, different from one another; a loss probability threshold for a first traffic type may be the same as the loss probability threshold for a second traffic type and the different from the loss probability threshold for a third traffic type.

Figure 6:
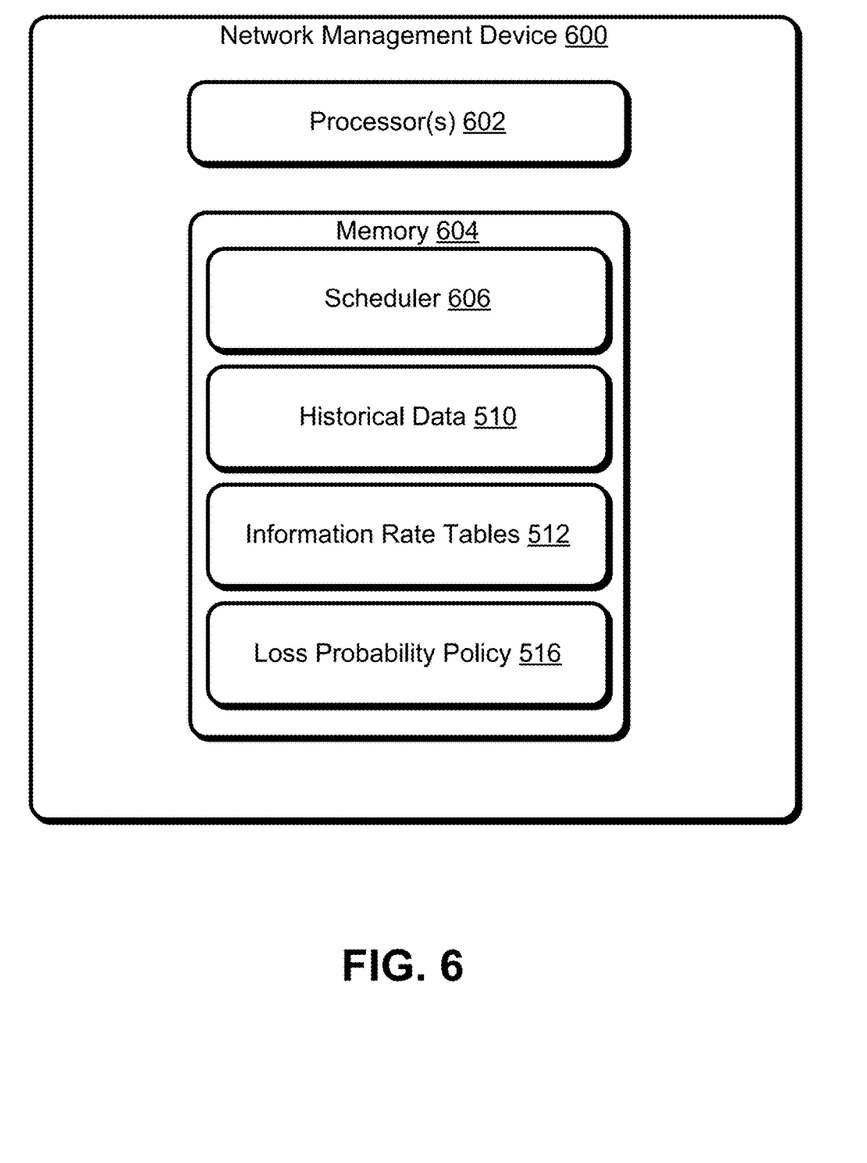
FIG. 6 illustrates a network management device configured to determine an information rate for dynamic cellular backhaul scheduling with carrier network.

FIG. 6 illustrates a network management device 600 configured to determine an information rate for dynamic network scheduling with carrier transport. As illustrated in FIG. 6, the network management device 600 includes processor(s) 602 and memory 604. The network management device 600 may be the same as or similar to the network management device 134.

The memory 604 includes a scheduler 606 determines a plurality of information rates for each state of the traffic type within each time slot within the time period (e.g., each 1 second time slot within a 1 day period) for each traffic type such that a probability loss threshold is not exceeded. The scheduler 606 may determine the probability loss thresholds from the loss probability policy 516. The probability loss thresholds indicated in the loss probability policy 516 may be the same as each other, different from one another; a loss probability threshold for a first traffic type may be the same as the loss probability threshold for a second traffic type and the different from the loss probability threshold for a third traffic type. The scheduler 606 determines the information rate based on the historical data 510 of the particular traffic type, such as based on the plurality of observed throughput rates of the traffic types during the plurality of previous time periods, as well as observed probabilities for the time slots, as is described elsewhere within this Detailed Description. The scheduler 606 may determine the information rates by employing a Chernoff bound approximation, or other approximation type, as discussed elsewhere within this Detailed Description. The scheduler 606 determines one or more information rate tables 512 based on the determined information rates. The tables enable a scheduler of a customer edge device, such as the scheduler 506 of the network device 500, to perform a look-up based on a current time slot and a current state of a traffic type for the current time slot, and to retrieve an information rate to allocate to the traffic type for the current time slot.

The scheduler 606 makes the information rate tables 512 available to a scheduler of a customer edge device. Making the information rate tables 512 available may include uploading some or all of the information rate tables, or updates to the information rate tables, to one or more customer edge devices, or taking other action.

In some embodiments, the processor(s) 502 and 602 include central processing units (CPUs), graphics processing units (GPUs), or both CPUs and GPUs, or any other sort of processing unit. Each of the one or more processor(s) 502 or 602 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 502 and 602 may also be responsible for executing all computer applications stored in the memories 504 and 604, which can be associated with common types of volatile (RAM) and/or nonvolatile (ROM) memory.

In various embodiments, memories 504 and 604 may include system memory, which may be volatile (such as RAM), non-volatile (such as ROM, flash memory, etc.) or some combination of the two. The memories 504 and 604 may also include additional data storage devices (removable and/or non-removable) such as, for example, magnetic disks, optical disks, or tape.

Memories 504 and 604 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the network device 500 and/or the network management device 600. Any such non-transitory computer-readable media may be part of the network device 500 and/or the network management device 600.

Variable CIR Provisioning

In some embodiments, CIR is time-varied, such as or example based on time of day, week, month, year, and so forth. A statistical maximum throughput rate for each time period is determined, such as in daytime and night. An oversubscribed CIR is determined for each time period based on the historical data, such as is described in to U.S. application Ser. No. 14/327,086, filed on Jul. 9, 2014, and entitled "Cellular Network Backhaul Oversubscription." In one example, a daytime peak data rate $R_{day}$ is determined for daytime (e.g., from 8 AM to 9 PM), using peak rate distribution in a busiest hour (e.g., 10 am to 11 am), as well as a nighttime peak data rate $R_{night}$ (from 9 pm to 8 am). CIRs for daytime and nighttime are then set based on $R_{day}$ and $R_{night}$, and the transport carrier dynamically provisions the CIR accordingly. Since a higher CIR costs more than a lower CIR, this theoretically lowers the CIR costs.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of allocating an information rate to a particular traffic type of a plurality of traffic types of egress traffic, the method comprising:
   determining a state of the particular traffic type for a particular time slot of a current time period;
   determining the information rate for the particular traffic type such that a loss probability threshold is not exceeded, the determining the information rate based on historical data of the particular traffic type, the historical data including a plurality of observed throughput rates of the particular traffic type during a plurality of previous time periods at which the particular traffic type experienced the state of the particular traffic type; and
   allocating the information rate to the particular traffic type for the particular time slot,
   wherein the information rate allocated for the particular traffic type differs from another information rate allocated for another traffic type of the plurality of traffic types of egress traffic.

2. The method of claim 1, wherein the information rate is a committed information rate (CIR), and the allocating includes allocating the CIR to the particular traffic type from a portion of a total CIR that is available to the egress traffic during at least the particular time slot.

3. The method of claim 2, wherein the egress traffic is aggregated traffic for a plurality of cellular sites, and the total CIR is an oversubscribed CIR for a single virtual circuit provided by a transport carrier.

4. The method of claim 1, wherein the state of the particular traffic type includes a number of connections for the particular traffic type that are extant during the particular time slot.

5. The method of claim 1, wherein the historical data further includes observed probabilities for each of the observed throughput rates.

6. The method of claim 5, wherein determining the information rate includes employing a Chernoff bound approximation to determine the information rate based on the loss probability threshold and the observed probabilities for each of the observed throughput rates.

7. The method of claim 1, wherein the particular time slot occurs during a current day, and the plurality of previous time periods includes a plurality of previous days.

8. The method of claim 7, wherein the observed throughput rates from which the information rate is determined includes only throughput rates of the particular traffic type during a plurality of time slots, the plurality of time slots having occurred at same or similar times as the particular time slot during the plurality of previous days.

9. The method of claim 1, wherein the plurality of traffic types of the egress traffic includes one or more of a voice traffic type, a data traffic type, a video traffic type, or a management traffic type.

10. A network device for allocating an information rate for a particular traffic type of a plurality of traffic types of egress traffic, the network device comprising:
a physical interface configured to couple the network device to a carrier network via a user-to-network interface (UNI);
a switching or routing fabric configured to direct the egress traffic to a virtual circuit provided by the carrier network via the UNI;
one or more processors; and
a scheduler stored on a memory and executable by the one or more processors to:
determine a state of the particular traffic type for a particular time slot of a current time period;
determine the information rate for the particular traffic type such that a loss probability threshold is not exceeded, the information rate determined based on historical data of the particular traffic type, the historical data including a plurality of observed throughput rates of the particular traffic type during a plurality of previous time periods at which the particular traffic type experienced the state of the particular traffic type; and
allocate the information rate to the particular traffic type for the particular time slot,
wherein the observed throughput rates from which the information rate is determined includes only throughput rates of the particular traffic type during a plurality of time slots, the plurality of time slots having occurred at same or similar times as the particular time slot during the plurality of previous time periods.

11. The network device of claim 10, wherein the information rate is a committed information rate (CIR), and the scheduler is configured to allocate the CIR to the particular traffic type from a portion of a total CIR that is available to the egress traffic on the virtual circuit during at least the time slot.

12. The network device of claim 11, wherein the egress traffic is aggregated traffic for a plurality of cellular sites, and the total CIR is an oversubscribed CIR for the virtual circuit.

13. The network device of claim 10, wherein the state of the particular traffic type includes a number of connections for the particular traffic type that are extant during the particular time slot.

14. The network device of claim 10, wherein the historical data further includes observed probabilities for each of the observed throughput rates, and the scheduler is further executable to determine the information rate using a Chernoff bound approximation based at least on the loss probability threshold and the observed probabilities for each of the observed throughput rates.

15. The network device of claim 10, wherein the plurality of traffic types each have differing egress priorities, the particular traffic type having neither a highest nor a lowest priority of the differing egress priorities.

16. A non-transitory computer-readable media storing a plurality of instructions executable by one or more processors of a computing device to:
determine a state of the particular traffic type for a particular time slot of a current time period;
determine the information rate for the particular traffic type such that a loss probability threshold is not exceeded, the information rate determined based on a plurality of observed throughput rates of the particular traffic type during a plurality of previous time periods at which the particular traffic type experienced the state of the particular traffic type;
allocate the information rate to the particular traffic type for the particular time slot; and
cause a plurality of packets or frames of the particular traffic type to be output via a physical interface to a carrier network at least at the information rate,
wherein the information rate allocated for the particular traffic type differs from another information rate allocated for another traffic type of the plurality of traffic types of egress traffic.

17. The non-transitory computer-readable media of claim 16, wherein the information rate is a committed information rate (CIR), and the allocating includes allocating the CIR to the particular traffic type from a portion of an oversubscribed CIR that is available to the egress traffic over a single virtual circuit provided by the carrier network during at least the time slot.

18. The non-transitory computer-readable media of claim 16, wherein the observed throughput rates from which the information rate is determined includes only throughput rates of the particular traffic type during a plurality of time slots, the plurality of time slots having occurred at same or similar times as the particular time slot during the plurality of previous time periods.

19. The non-transitory computer-readable media of claim 16, wherein the information rate is time-varied.

* * * * *